United States Patent [19]

Wada

[11] Patent Number: 4,485,680

[45] Date of Patent: Dec. 4, 1984

[54] FLOW VELOCITY MEASURING APPARATUS

[75] Inventor: Shunichi Wada, Hyogo, Japan

[73] Assignee: Mitsubishi Denki Kabushiki Kaisha, Tokyo, Japan

[21] Appl. No.: 446,763

[22] Filed: Dec. 3, 1982

[30] Foreign Application Priority Data

Mar. 15, 1982 [JP] Japan .................................. 57-43557

[51] Int. Cl.³ .............................................. G01F 1/32
[52] U.S. Cl. ................................................ 73/861.22
[58] Field of Search .................. 73/861.22, 861.24, 204

[56] References Cited

U.S. PATENT DOCUMENTS 3,564,915 2/1971 Tomota et al. .................... 73/861.22
4,386,520 6/1983 Nagaishi ........................... 73/861.22

Primary Examiner—Herbert Goldstein
Attorney, Agent, or Firm—Bernard, Rothwell & Brown

[57] ABSTRACT

A flow velocity measuring apparatus includes a vortex-generating member disposed in the flow path and a temperature-resistance converting element positioned in contact with vortexes produced at the downstream side. A bridge circuit includes as one side the temperature-resistance converting element, and an amplifier circuit amplifies the output of the bridge circuit to provide a detection signal having a frequency corresponding to the periodic change in temperature of the element due to cooling action of the vortexes. A comparator provides one of a high level or a low level at the input end of the amplifier circuit to keep the temperature-resistance converting element at a first temperature when the level of the detection signal is lower than a prescribed preset value and provides the other of a high level or a low level at the input of the amplifier circuit to maintain the element at a second temperature higher than the first temperature when the level of the detection signal is higher than the prescribed preset value.

4 Claims, 4 Drawing Figures

FLOW VELOCITY MEASURING APPARATUS

BACKGROUND OF THE INVENTION

1. Field of the Invention

This invention relates to an apparatus for measuring a flow velocity of fluid by detecting a time interval of vortexes being generated at the downstream side of a member for generating vortexes (hereinafter referred to "vortex-generating member") placed in a flow of the fluid.

2. Description of the Prior Art

In flow velocity measuring apparatuses of such type as mentioned above, a thermistor has usually been employed as a means for detecting Karman's vortex street or Strouhl vortexes being produced on the downstream side of a vortex-generating member used. To the thermistor utilized as such member for detecting vortexes, constant current is always supplied in order to maintain a temperature thereof to a prescribed constant value. From the thermistor, variation in value of resistance at the time when the thermistor is cooled by means of contact with vortexes is taken out as a detection signal. Since vortexes are produced with such a time interval being in a prescribed functional relationship with respect to the flow velocity of fluid, when frequency of the detection signal taken out of the thermistor is measured, the flow velocity of the fluid can be determined. In a conventional flow velocity measuring apparatus, such detection signal is converted into DC voltage signal by a frequency-voltage converting means, and a thermistor is subjected to feedback controlling in response to the resulting DC voltage. Accordingly, response speed of detection output of the thermistor is restricted by response speed of the frequency-voltage converting circuit, i.e., time constant thereof. Furthermore, such feedback controlling requires correction of detection signal within a considerably wide area of a range of flow velocity being measurable so that the feedback circuit becomes complicated.

Temperature-resistance converting elements other than thermistor may be utilized in such flow velocity measuring apparatuses as mentioned above. However, even though any type of detection element is used, the required condition for avoiding disappearance of detection signal due to vortexes is such that a temperature of the detection element or time constant of variation in the current flowing through the detection element differs from time constant of variation in temperature on the basis of cooling by means of vortexes. However, in the case where a time constant in the feedback circuit is lengthy, the detection output is disordered at sudden change of flow velocity, and further an excess current flows temporarily through the detection element, resulting in danger of damage of the detection element due to overheating thereof.

SUMMARY OF THE INVENTION

According to the present invention, there is provided a flow velocity measuring apparatus which comprises a bridge circuit formed by utilizing a temperature-resistance converting element as a side of the bridge circuit, and an amplifier circuit for amplifying output of the bridge circuit, the temperature-resistance converting element being placed at the downstream side of a vortex-generating member disposed in a flow path of fluid to be measured, an output of the amplifier circuit being used as such output signal having a frequency corresponding to flow velocity of the fluid to be measured, and at the same time, such current to be fed back to the bridge circuit being adapted to be used in such a way that the current is controlled in order to maintain the temperature-resistance converting element at a prescribed temperature. The temperature-resistance converting element is maintained at a low preset temperature which has previously been determined in such a condition where flow velocity of the fluid to be measured is relatively low, but when the flow velocity reaches a value higher than a prescribed one, the temperature-resistance converting element is maintained at a higher preset temperature which has also previously been set, whereby the flow velocity can accurately be measured with high sensitivity in respect of a wide range of flow velocity.

It is an object of the present invention to provide a flow velocity measuring apparatus by which flow velocity can accurately be measured extending over a wide range thereof.

Another object of the present invention is to prolong a service life of a temperature-resistance converting element being in contact with fluid to be measured.

BRIEF DESCRIPTION OF THE DRAWINGS

FIG. 1 (b) is a perspective view of those shown in FIG. 1 (a);

DESCRIPTION OF THE PREFERRED EMBODIMENT

Figure 1:
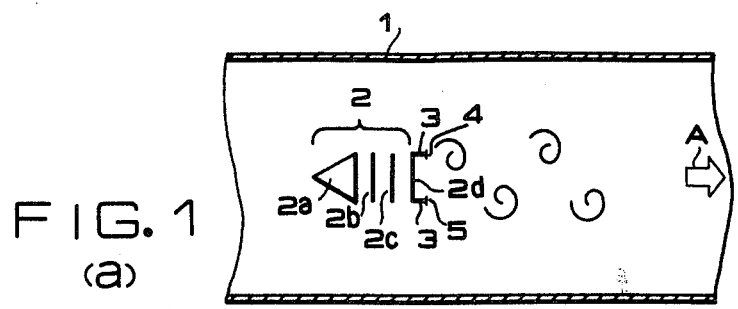
FIG. 1 (a) is a planar view showing an arrangement of a vortex-generating member and two heater wires utilized in a flow velocity measuring apparatus according to an embodiment of the present invention.
Figure 1:
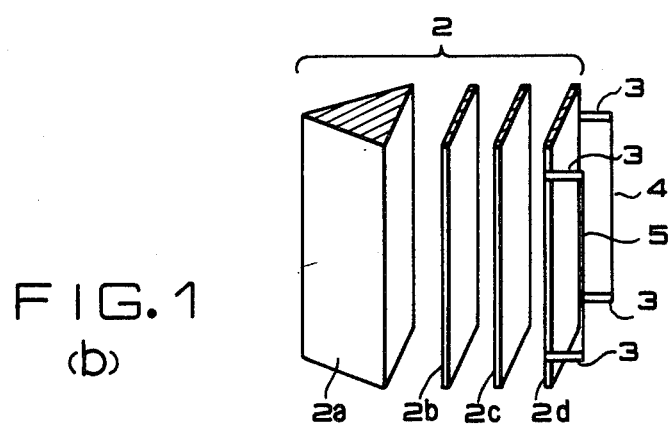

Next, the explanation will be made hereinbelow by referring to the accompanying drawings. In FIG. 1 (a), reference numeral 1 designates a conduit through the inside of which fluid to be measured flows in the direction indicated by arrow A, and a vortex-generating member 2 consisting of a trigonal prism 2a as well as three plates 2b, 2c and 2d are disposed in the conduit 1. The trigonal prism 2a and the plates 2b, 2c and 2d are arranged in this order from the upstream side to the downstream side of flow of the fluid with a prescribed spacing from one another so that the vortex-generating member 2 generates regular Karman's vortexes on the downstream side of the plate 2d positioned at the most downstream side in the aforesaid plates. Two pairs of supports 3 extending towards the downstream side of flow of the fluid are fitted at both sides of the plate 2d, respectively, as shown in FIG. 1 (b), and heater wires 4 and 5 are stretched between each pair of the supports, respectively. Each of the heater wires 4 and 5 is periodically cooled by means of Karman's vortex street being produced around the heater wires 4 and 5, respectively.

Figure 2:
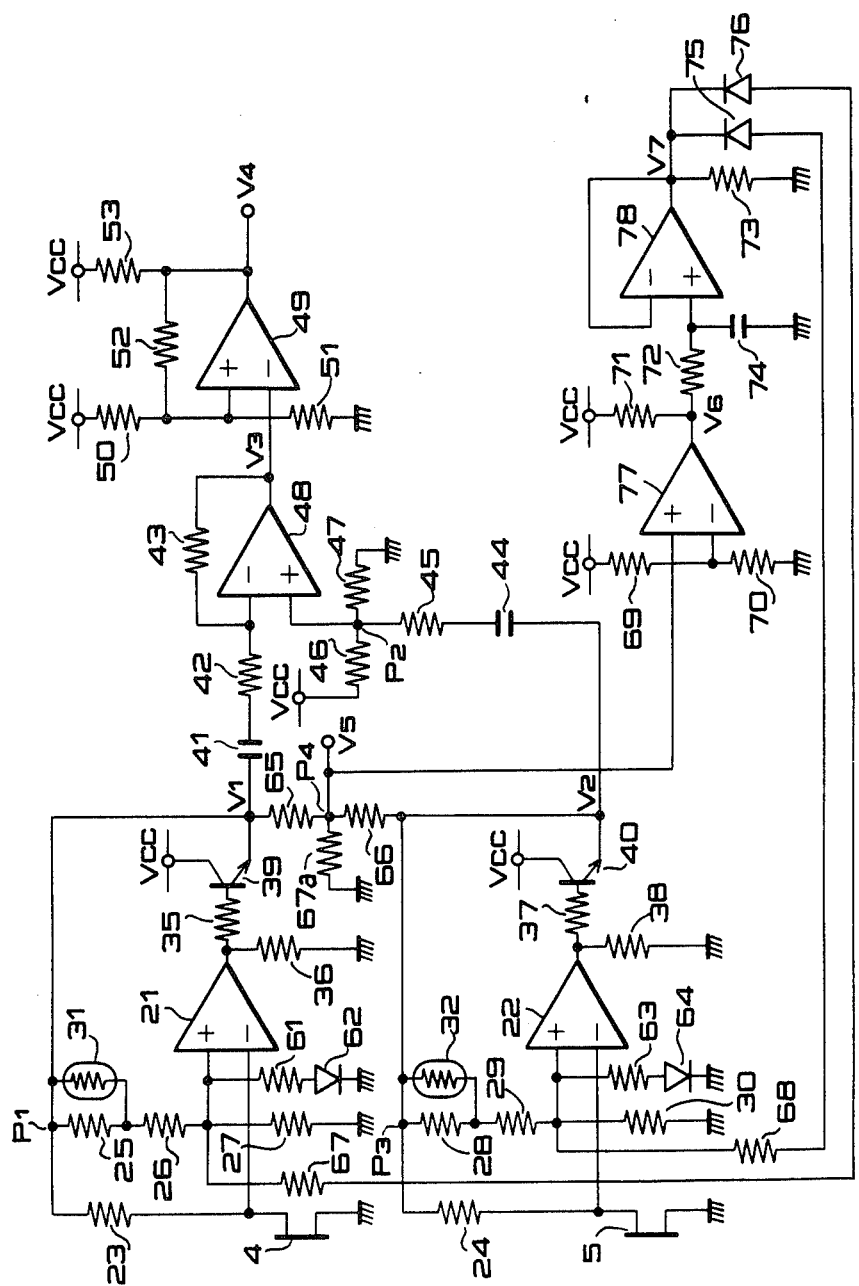
FIG. 2 is a circuit diagram of the flow velocity measuring apparatus in FIGS. 1 (a) and 1 (b)

The vortex-generating member shown in FIGS. 1 and 2 is the one having a construction which has already been well known as a member for generating Karman's vortexes. In the present invention, any type of vortex-generating member which has heretofore been utilized for generating Karman's vortexes may be used; besides such a vortex-generating member for generating Strouhl vortexes may also be applied to the apparatus of the present invention as in customary flow velocity measuring apparatuses.

FIG. 2 is a circuit diagram illustrating electrical connection in the flow velocity measuring apparatus according to the present invention in which each one end of the heater wires 4 and 5 is grounded, whilst another end of the heater wire 4 is connected with an inverting input terminal of an operational amplifier 21 and at the same time, the same end is connected to the emitter of a transistor 39 through a resistance 23. A contact point $P_1$ of this emitter with the resistance 23 is grounded through a series circuit being composed of resistances 25–27, whilst a thermistor 31 is connected in parallel to the resistance 25.

A contact point of the resistance 26 with the resistance 27 is connected to a non-inverting input terminal of the operational amplifier 21, besides this non-inverting input end is grounded through a resistance 61 and a diode 62, and at the same time the same end is connected with an output end of an operational amplifier 78 through a series circuit consisting of a diode 76 and a resistance 67.

A bridge circuit is constructed by means of the aforesaid heater wire 4, the resistance 23, the resistances 25–27, and the thermistor 31. A feedback circuit which comprises the operational amplifier 21 and the transistor 39 as its principal constituents operates together with the bridge circuit so as to control the heater wire 4 in such a manner that the heater wire 4 is maintained at a constant temperature.

An output end of the operational amplifier 21 is connected to the base of the transistor 39 through a resistance 35, and the same end is grounded through a resistance 36. In the circuit, it is constructed in such a way that voltage Vcc is applied to the collector of the transistor 39, whilst output $V_1$ appears on the emitter thereof as detection output of the heater wire 4 cooled by means of Karman's vortexes.

The emitter of the transistor 39 is connected with an inverting input end of an operational amplifier 48 through a capacitor 41 and a resistance 42. A resistance 43 is connected between the inverting input end and the output end of the operational amplifier 48, and further a non-inverting input end of the operational amplifier 48 is connected with a contact point $P_2$. The voltage Vcc is applied to the contact point $P_2$ through a resistance 46, and further the contact point $P_2$ is grounded through a resistance 47.

Likewise, another end of the heater wire 5 is connected with the inverting input end of an operational amplifier 22 and further is connected to the emitter of a transistor 40 through a resistance 24. A contact point $P_3$ of the above emitter with the resistance 24 is grounded through resistances 28–30, and a thermistor 32 is connected in parallel to the resistance 28. A contact point of the resistance 29 with the resistance 30 is connected to a non-inverting input end of the operational amplifier 22. This non-inverting input end is grounded through a series circuit consisting of a resistance 63 and a diode 64, and at the same time, is connected to the output end of operational amplifier 78 through a series circuit consisting of a diode 75 and a resistance 68.

The heater wire 5, the resistances 24 and 28–30 and the thermistor 32 constitute a bridge circuit. A feedback circuit which comprises the operational amplifier 22 and the transistor 40 as its principal constituents operates together with the bridge circuit so as to control the heater wire 5 in such a manner that the heater wire 5 is maintained at a constant temperature.

An output end of the operational amplifier 22 is connected to a base electrode of the transistor 40 through a resistance 37 and is grounded through a resistance 38; besides, voltage Vcc is applied to the collector electrode of the transistor 40. Furthermore, it is arranged such that a detection output $V_2$ derived from the heater wire 5 cooled by Karman's vortexes appears on the emitter electrode of the transistor 40.

The emitter of the transistor 40 is also connected with a contact point $P_4$ through a resistance 66. This contact point $P_4$ is connected to the emitter of the aforesaid transistor 39 through a resistance 65 and is grounded through a resistance 67a so that voltage $V_5$ proportional to a sum of $V_1$ and $V_2$ generates in this contact point $P_4$.

Moreover, the emitter of the transistor 40 is also connected with the contact point $P_2$ through a capacitor 44 and a resistance 45. Thus, the output $V_2$ is applied to the non-inverting input end of the operational amplifier 48 through the capacitor 44 and the resistance 45, whilst the output $V_1$ is applied to the inverting input end thereof through the capacitor 41 and the resistance 42 so that difference between the output $V_1$ and the output $V_2$ is amplified by the operational amplifier 48. Therefore, detection output $V_3$ appearing on the output end of the operational amplifier 48 corresponds to the output which is derived only from Karman's vortexes.

The output end of the operational amplifier 48 is connected to the inverting input end of a voltage comparator 49. Voltage Vcc is applied to the non-inverting input end of the voltage comparator 49 through a resistance 50, and the non-inverting input end thereof is grounded through a resistance 51. A resistance 52 is connected between the non-inverting input end and the output end of the voltage comparator 49, and further voltage Vcc is applied to the output end thereof through a resistance 53.

The voltage comparator 49 constitutes together with the resistances 50–53 a waveform shaping circuit converting the output $V_3$ of the operational amplifier 48 into pulse output $V_4$.

On the other hand, a circuit being composed of the resistances 65, 66, 67a is a circuit for outputting a sum signal $V_5$ of the output $V_1$ and the output $V_2$, and the value $V_5$ is the one responding to average flow velocity of fluid to be measured. The output $V_5$ is applied to the non-inverting input end of a voltage comparator 77. Voltage Vcc is impressed to the inverting input end of the voltage comparator 77 through a resistance 69, and further is grounded through a resistance 70.

Voltage Vcc is impressed to the output end of the voltage comparator 77 through a resistance 71, and the same output end is connected with the non-inverting input end of the operational amplifier 78 through a resistance 72. This non-inverting input end is grounded through a capacitor 74. The output end of the operational amplifier 78 is grounded through a resistance 73, and further the same output end is connected to the inverting input end of the operational amplifier 78.

A circuit being composed of the aforesaid resistances 69–71 and the voltage comparator 77 is the one for deciding whether a value of the output $V_5$ reaches a specified value Vth or not in which when the output $V_5$ is lower than the specified value, output $V_6$ of the voltage comparator 77 is in level "L", whilst when the output $V_5$ is over the specified value, the output $V_6$ is in level "H".

Furthermore, the resistance 72 and the capacitor 74 construct a delay circuit for the aforesaid output $V_6$ which is the one for delaying rate of change in respect of level at the time of switching the same. The operational amplifier 78 and the resistance 73 construct a buffer amplifier for amplifying delay signal of the output $V_6$, and which puts out output $V_7$.

The resistance 67 and a diode 76 are the ones for switching a preset temperature of the heater wire 4. In the case when the output $V_7$ is in level "L", a temperature of the heater wire 4 is preset at a rather low temperature, whilst the temperature of the heater wire 4 is preset at a rather high temperature in the case when the output $V_7$ is in level "H".

Moreover, in the intermediate level extending over "H" to "L", any intermediate value spreading from rather high to rather low values may continuously be adopted in respect of the temperature of the heater wire 4.

The resistance 68 and a diode 75 operate for switching a preset temperature of the heater wire 5, and the functions thereof are similar to those in case of the heater wire 4.

Further, the thermistors 31 and 32 are the ones for detecting a temperature of fluid to be measured to correct the preset temperatures of the heater wires 4 and 5, respectively.

Next, operations of the flow velocity measuring apparatus constructed as mentioned above according to the present invention will be described hereinbelow.

First, the bridge circuit being constructed of the heater wire 4, resistances 23 and 25–27, and the thermistor 31 will be observed. If it is assumed that the voltage $V_1$ impressed across the input ends of the bridge circuit as well as a resistance value of the thermistor 31 are constant, respectively, the output voltage of the bridge circuit is proportional to a resistance value or a temperature of the heater wire 4. As mentioned above, since the heater wire 4 is disposed at a position contacting with either Karman's vortex street produced on the downstream side of the vortex-generating member 2, the heater wire 4 is periodically cooled in response to the interval of the vortexes produced. Thus, the output voltage of the bridge circuit varies with the same period as the interval of the vortexes in either Karman's vortex street. The output voltage of this bridge circuit is amplified by functions of the operational amplifier 21 and the transistor 39 to produce the output voltage $V_1$. When the voltage $V_1$ is fed back to the bridge circuit, the heater wire 4 is maintained substantially at a constant temperature.

Similar operations are performed in respect of the other heater wire 5 so that the output voltage $V_2$ appears on the emitter side of the transistor 40.

The output signal $V_1$ is supplied to the inverting input end of the operational amplifier 48 through the capacitor 41 and the resistance 42, whilst the output signal $V_2$ is supplied to the non-inverting input end of the operational amplifier 48 through the capacitor 44 and a voltage regulating circuit being composed of the resistances 45–47. The operational amplifier 48 has a function of operating a difference between ac signals supplied to the above two input ends and therefore, the output signal $V_3$ is a signal based on the difference between the signals $V_1$ and $V_2$, i.e., only on the Karman's vortexes. In this embodiment, the signal $V_3$ is converted into the pulse signal $V_4$ having the same frequency with that of the signal $V_3$ by means of a converting circuit involving the voltage comparator 49 in order to make processing of the signal easy in the succeeding stage.

On the other hand, the voltage signals $V_1$ and $V_2$ are added in an adder consisting of the resistances 65, 66, 67a to obtain the signal $V_5$, and the resulting signal $V_5$ is compared with the specified value Vth which has previously been set in the comparator 77. Thus, the output signal $V_6$ of the comparator 77 possesses the level "H" in the case where a level of the signal $V_5$ is over the specified value Vth, while the level "L" in the case where the level of the signal $V_5$ is lower than the specified value. The signal $V_6$ is delayed by means of a delay circuit composed of the resistance 72 and the capacitor 74, and then, the signal delayed is amplified by the buffer amplifier 78. In the case where the output signal $V_7$ of the buffer amplifier 78 is in the level "H", the diode 76 is non-conductive state so far as the level at the non-inverting input end of the operational amplifier 21 is lower than the level of the signal $V_7$, and as a result, the non-inverting input end of the operational amplifier 21 is maintained at a high level preset. In this situation, an output level of the operational amplifier 21, i.e., a quantity fed back to the heater wire 4 is preset at a large value so that the heater wire 4 is maintained at a high temperature preset. In the case when the signal $V_7$ reaches the level "L", the level at the non-inverting input end of the operational amplifier 21 is preset at the lowest value, while the level at the non-inverting input end of the operational amplifier 21 is at an intermediate value in the case when the level of the signal $V_7$ is an intermediate value in between the levels "H" and "L". The other diode 75 connected to the output end of the amplifier 78 is useful for presetting a voltage level at the non-inverting input end of the operational amplifier 22 in response to the level of the signal $V_5$, whereby a temperature of the heater wire 5 is similarly preset to that of the case of the heater wire 4.

Figure 3:
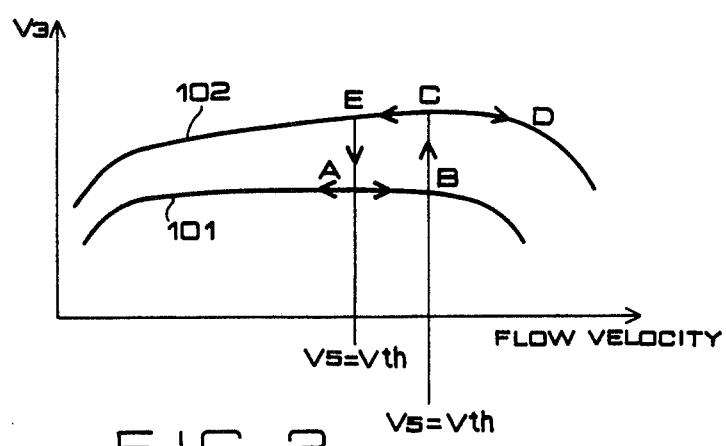
FIG. 3 is a graphical representation indicating change due to flow velocity in characteristics with sensitivity of frequency signal in the circuit of FIG. 2.

FIG. 3 is a graphical representation showing an example of sensitivity characteristics of the output $V_3$ with respect to flow velocity of fluid to be measured in which curve 101 indicates characteristics in the case where preset temperatures of the heater wires 4 and 5 are low, respectively, whilst curve 102 indicates characteristics in the case when the preset temperatures of both the heater wires are high, respectively.

In case where a flow velocity of the fluid to be measured is low, level of the output $V_5$ being the sum of the detection signal $V_1$ of the heater wire 4 and the detection output $V_2$ of the heater wire 5 is lower than the specified voltage Vth, as mentioned above, so that the heater wires 4 and 5 are automatically preset at the respective preset temperatures. In this condition, sensitivity of the output $V_3$ exibits such tendency that with increase of flow velocity of the fluid to be measured, the sensitivity increases until it reaches a certain value along the curve 101, thereafter it shifts at a substantially constant ratio, and when the sensitivity reaches a certain value, it decreases. The specified voltage Vth should be preset at the same value as the level of the output $V_5$ being obtained at a flow rate immediately before turning the sensitivity of the output $V_3$ decreasing. If the specified voltage Vth has appropriately been preset, the output $V_5$ reaches the specified voltage Vth at point B being immediately before turning the sensitivity of the output $V_3$ decreasing. As the result, the output $V_6$ of the comparator 77 inverts the level "L" to the level "H" so that input voltage level of the buffer amplifier 78 increases gradually and thus, level of the output $V_7$ gradually increases up to a prescribed value. The increase in level of the output $V_7$ brings in rise in temperatures of the heater wires 4 and 5, whereby sensitivity of the output $V_3$ shifts from the point B on the curve 101 to point C on the curve 102. The curve 102 keeps a high sensitivity level up to a region where the flow velocity is high as compared with that of the curve 101. Accordingly, even if the flow velocity increases up to around point D, the sensitivity of the output $V_3$ has a value sufficient for practical use.

Next, such a case where the flow velocity decreases gradually from the point D will be observed. When temperatures of the heater wires 4 and 5 belong to the higher preset temperatures, the output voltage $V_5$ becomes a higher value than that of the case where the temperatures of both the heater wires are preset at the lower preset temperatures. Under the circumstances, even though the flow rate passes through the point C and decreases further, the output $V_5$ keeps a higher value than the specified value Vth. Such a case where the output $V_5$ decreases up to the specified value Vth is in the event that the flow velocity reaches point E being lower than the point C, and at this moment, level of the output $V_6$ turns from the level "H" to the level "L". When the output $V_6$ turns to the level "L", a level of input signal of the buffer amplifier 78 decreases gradually so that when the level of the output signal $V_7$ becomes stable at the lower preset value, the temperatures of the heater wires 4 and 5 are stabilized at values of lower ones, respectively.

Although the above explanation has been made in respect of the case where two heater wires are employed, either of the heater wires may be omitted if not so high precision is required. For instance, in the case where the heater wire 5 is omitted in the circuit illustrated in FIG. 2, the emitter of the transistor 39 is connected to the input end of the voltage comparator 49 through the capacitor and the resistance 42, and is connected with the non-inverting input end of the comparator 77 through the resistance 65. In also this case, the preset temperature of the heater wire 4 is switched and thus, the switching of sensitivity as mentioned above is effected.

In addition, the present invention is similarly applicable for the case where the vortex-generating member 2 is a Strouhl vortex-generating member.

Each of the heater wires utilized as a vortex-detecting element in the above-mentioned embodiment possesses such characteristics that its resistance value varies sharply in response to the change in ambient temperature. Therefore, such heater wire is advantageous for the purpose of realizing high sensitivity. However, a temperature-resistance converting element being utilized customarily in the field of this invention such as a thermistor having positive or negative temperature-resistance characteristics may also advantageously be used.

As described above, temperature of the temperature-resistance converting element can automatically be turned over in such manner that the temperature is set at a lower temperature in case of low flow velocity, whilst the temperature is set at the higher temperature in case of high flow velocity in response to the flow velocity of fluid to be measured in the flow velocity measuring apparatus according to the present invention.

Accordingly, the flow velocity measuring apparatus of the present invention has such advantages in that a range for measuring flow velocity becomes broader, and that since the temperature-resistance converting element can be used at a low temperature in such a region where the flow velocity is low, life of the converting element can be prolonged.

What is claimed is:

1. A flow velocity measuring apparatus comprising:
    a vortex-generating member disposed in flow path of fluid to be measured;
    at least one temperature-resistance converting element placed in a position being capable of contacting with vortexes which are produced at the downstream side of said vortex-generating member;
    a bridge circuit including said temperature-resistance converting element as a side of said bridge circuit;
    an amplifier circuit for amplifying the output of said bridge circuit to send out a detection signal which has a frequency corresponding to the periodical change in the temperature of said element due to the cooling action by means of said vortexes;
    a feedback circuit for supplying feedback current corresponding to the voltage of said detection signal to keep the temperature of said temperature-resistance converting element at a desired variable temperature; and
    a comparator for providing one of a high level H or a low level L to maintain an input end of said amplifier circuit at a first preset value to keep said temperature-resistance converting element at a first temperature when the level of said detection signal is lower than a prescribed preset value, whilst providing the other of a high level H or a low level L to maintain the input end of said amplifier circuit at a second preset value to keep said temperature-resistance converting element at a second temperature higher than said first temperature when the level of said detection signal is higher than said prescribed preset value.

2. A flow velocity apparatus comprising
    a vortex-generating member disposed in flow path of fluid to be measured;
    two temperature-resistance converting elements placed in positions being capable of contacting with vortexes which are produced at the downstream side of said vortex-generating member;
    a first-bridge circuit including the first temperature-resistance converting element as a side of said first bridge circuit;
    a first amplifier circuit for amplifying the output of said first bridge circuit to send out a first detection signal which has a frequency corresponding to the periodical change in the temperature of said first element due to the cooling action by means of said vortexes;
    a first converting circuit for supplying feedback current corresponding to the voltage of said first detection signal to keep temperature of said first temperature-resistance converting element at a desired variable temperature;
    a second bridge circuit including the second temperature-resistance converting element as a side of said second bridge circuit;
    a second amplifier circuit for amplifying the output of said second bridge circuit to send out a second detection signal which has a frequency corresponding to periodical change in temperature of said second element due to the cooling action by means of said vortexes;

a second converting circuit for supplying feedback current corresponding to the voltage of said second detection signal to keep temperature of said second temperature-resistance converting element at a desired variable temperature;

a circuit for outputting a signal corresponding to the sum of said first and second detection signals as a flow velocity signal; and a comparator for providing one of a high level H or a low level L at each input end of said first and second amplifier circuits to maintain a first preset value to keep said first and second temperature-resistance converting elements at a first temperature when the level of said sum signal corresponding to the sum of said first and second detection signals is lower than a prescribed preset value, whilst providing the other of a high level H or a low level L to maintain each input end of said first and second amplifier circuits at a second present value to keep said first and second temperature-resistance converting elements at a second temperature higher than said first temperature when the level of said sum signal is higher than said prescribed value.

3. An apparatus as claimed in claim 1 or 2, wherein a delay circuit for delaying output signal of said comparator is connected to the output end of said comparator.

4. An apparatus as claimed in claim 2, wherein each of said first and second amplifier circuits is provided with an operational amplifier connected to each output end of the corresponding bridge circuit and a transistor which has a base connected with the output end of said operational amplifier, a collector connected to a dc power source, and an emitter connected to the input end of the corresponding bridge circuit.

* * * * *